(12) United States Patent
Maruya et al.

(10) Patent No.: US 9,746,929 B2
(45) Date of Patent: Aug. 29, 2017

(54) GESTURE RECOGNITION USING GESTURE ELEMENTS

(71) Applicant: QUALCOMM Incorporated, San Diego, CA (US)

(72) Inventors: Yoshihisa Maruya, Tokyo (JP); Michael William Paddon, Tokyo (JP); Matthew Christian Duggan, Tokyo (JP); Kento Tarui, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 14/548,775

(22) Filed: Nov. 20, 2014

(65) Prior Publication Data

US 2016/0124512 A1     May 5, 2016

Related U.S. Application Data

(60) Provisional application No. 62/069,923, filed on Oct. 29, 2014.

(51) Int. Cl.

| G06F 3/033 | (2013.01) |
|---|---|
| G06F 3/01 | (2006.01) |
| G06F 3/0484 | (2013.01) |
| G06K 9/00 | (2006.01) |
| G06F 3/0488 | (2013.01) |
| G06K 9/72 | (2006.01) |

(52) U.S. Cl.
CPC .......... *G06F 3/017* (2013.01); *G06F 3/04842* (2013.01); *G06F 3/04883* (2013.01); *G06K 9/00335* (2013.01); *G06K 9/00355* (2013.01); *G06K 9/00416* (2013.01); *G06K 9/00429* (2013.01); *G06K 9/72* (2013.01)

(58) Field of Classification Search
CPC ... G06F 3/017; G06F 3/04842; G06F 3/04883
USPC ........................................................ 715/863
See application file for complete search history.

(56) References Cited

U.S. PATENT DOCUMENTS

| 8,250,001 | B2 | 8/2012 | Tirpak et al. |
|---|---|---|---|
| 8,565,535 | B2 | 10/2013 | Shamaie |
| 8,570,383 | B2 | 10/2013 | Klefenz et al. |
| 8,582,037 | B2 | 11/2013 | Stern et al. |
| 8,694,953 | B2 * | 4/2014 | Khodabandehloo ...... G06F 8/20 715/717 |
| 9,417,754 | B2 * | 8/2016 | Smith ...................... G06F 3/048 |
| 9,513,798 | B2 * | 12/2016 | Helmes ............... G06F 3/03543 |
| 9,619,963 | B2 * | 4/2017 | Elias ................... G07F 17/3225 |
| 2009/0052785 | A1 | 2/2009 | Shamaie |
| 2012/0014601 | A1 | 1/2012 | Jiang et al. |
| 2013/0110804 | A1 * | 5/2013 | Davis ................ G06F 17/30967 707/706 |

(Continued)

OTHER PUBLICATIONS

International Search Report and Written Opinion—PCT/US2015/054177—ISA/EPO—Nov. 19, 2015.

*Primary Examiner* — William Titcomb
(74) *Attorney, Agent, or Firm* — Loza & Loza, LLP (57) ABSTRACT

Aspects of the present disclosure provide a gesture recognition method and an apparatus for capturing gesture. The apparatus categorizes the raw data of a gesture into gesture elements, and utilizes the contextual dependency between the gesture elements to perform gesture recognition with a high degree of accuracy and small data size. A gesture may be formed by a sequence of one or more gesture elements.

22 Claims, 9 Drawing Sheets

(56) References Cited

U.S. PATENT DOCUMENTS

2014/0191955 A1    7/2014  Raffa et al.
2014/0201271 A1*  7/2014  Paddon ................... H04L 67/22
                                                        709/204
2014/0285425 A1    9/2014  Takahashi et al.

* cited by examiner

GESTURE RECOGNITION USING GESTURE ELEMENTS

CROSS-REFERENCE TO RELATED APPLICATIONS

This application claims priority to and the benefit of provisional patent application No. 62/069,923, titled Gesture Recognition Using Gesture Elements, filed in the United States Patent and Trademark Office on 29 Oct. 2014, the entire content of which is incorporated herein by reference.

TECHNICAL FIELD

The technology discussed below relates generally to inputting information to electronic devices, and more particularly, to inputting information using gesture recognition.

BACKGROUND

Motion capturing wearable devices have been released in increasing numbers. Some examples are smart watches, activity trackers, smart glasses, etc. A user can interface with such devices by various methods including physical buttons, touch (virtual) buttons, soft keys, a touchscreen, a touchpad, image sensors, or motion capturing sensors. Furthermore, some devices may be equipped to perform gesture recognition as a way of interacting with the devices. A gesture as used in this disclosure generally refers to a series of movements in time that can be captured by the device using various sensors. For example, the gesture may be performed using an object such as a stylus, a finger, a hand, a wand, or any suitable object. A recognized gesture can cause a device to perform certain action(s) or no action, or represent input information to the device. In general, a gesture recognition system performs gesture recognition based on the raw data obtained from a device's sensor(s) (e.g., motion sensors). The raw data refers to the data obtained from any sensor(s) of the device that has not been subjected to substantial processing or other manipulations related to gesture recognition, and may also be referred to as primary data or sensor data. Raw data based gesture recognition algorithms typically need to recognize gestures with a high degree of accuracy in order to achieve a more natural input from a user's perspective. Existing gesture recognition techniques may use simple machine learning on raw data using well-known techniques such as Hidden Markov Models (HMMs) on an entire input sequence (raw data) of a gesture.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a gesture recognition method and an apparatus for capturing gesture. The raw data of a gesture is categorized into gesture elements, and a gesture may be formed by a sequence of one or more gesture elements. The contextual dependency between the gesture elements is utilized to perform gesture recognition with a high degree of accuracy.

In one aspect, the disclosure provides a method of recognizing gesture operable at an apparatus. The apparatus generates raw data of a gesture from one or more gesture capturing sensors, categorizes the raw data into one or more gesture elements, determines a contextual dependency between the one or more gesture elements, and recognizes the gesture based on the determined gesture elements.

Another aspect of the disclosure provides an apparatus for recognizing gesture. The apparatus includes one or more gesture capturing sensors, a raw data capture block configured to generate raw data of a gesture from the gesture capturing sensors, a gesture elements categorizing block configured to categorize the raw data into one or more gesture elements, a contextual dependency determining block configured to determine a contextual dependency between the one or more gesture elements, and a gesture recognition block configured to recognize the gesture based on the determined gesture elements.

Another aspect of the disclosure provides an apparatus for recognizing gesture. The apparatus includes means for generating raw data of a gesture from one or more gesture capturing sensors, means for categorizing the raw data into one or more gesture elements, means for determining a contextual dependency between the one or more gesture elements, and means for recognizing the gesture based on the determined gesture elements.

Another aspect of the disclosure provides a computer-readable medium including code for causing an apparatus to recognize gesture. The code when executed causes the apparatus to generate raw data of a gesture from one or more gesture capturing sensors, categorize the raw data into one or more gesture elements, determine a contextual dependency between the one or more gesture elements, and recognize the gesture based on the determined gesture elements.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide a gesture recognition method and an apparatus that categorizes the raw data of a gesture into gesture elements to perform gesture recognition. The method utilizes the contextual dependency between the gesture elements to perform gesture recognition with a high degree of accuracy and efficiency. A gesture can be composed of a sequence of one or more gesture elements. Each gesture element may be a predetermined movement or a distinguishable movement that can be identified from the raw data. In various aspects of the disclosure, a gesture may be recognized by utilizing the contextual dependency of the gesture elements of the gesture. The use of gesture elements can facilitate increased number of recognizable gestures that are defined as various combinations of gesture elements.

Figure 1:
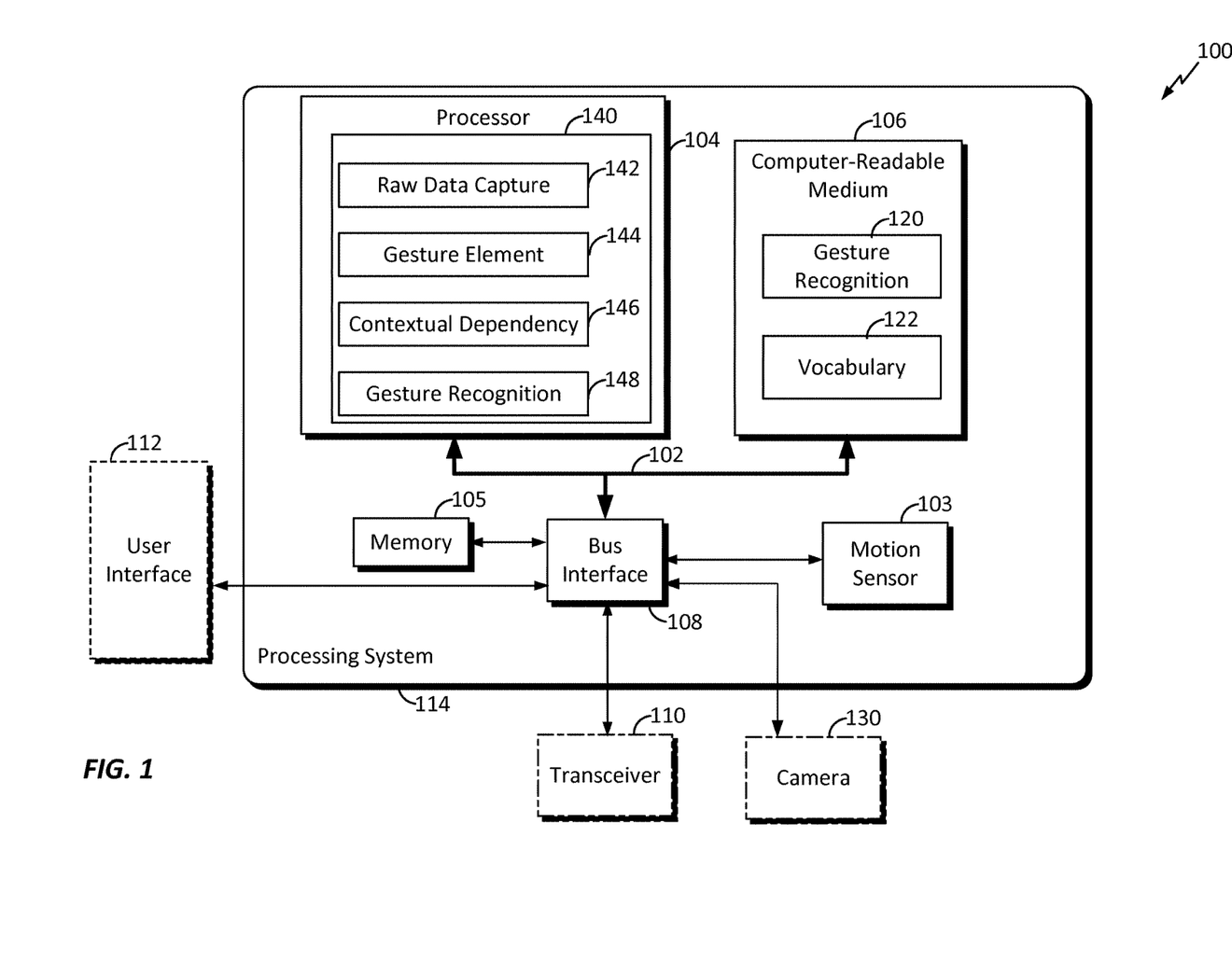
FIG. 1 is a block diagram illustrating an example of a hardware implementation for an apparatus employing a processing system in accordance with aspects of the disclosure.

FIG. 1 is a diagram illustrating an example of a hardware implementation for an apparatus 100 employing a processing system 114. The apparatus 100 may be a mobile telephone, a computing device, a gaming device, a handheld computer, a smartphone, a wearable computing device, a tablet computer, a portable media player, a media recording device, an Internet of Things (IoT) device, etc. The various components, blocks, and or circuitry of the apparatus 100 may be implemented in software, hardware, firmware, and/ or a combination thereof. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes or functions described below and illustrated in FIGS. 2-9.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more motion sensors 103, one or more processors (represented generally by the processor 104), a memory 105, and computer-readable media (represented generally by the computer-readable medium 106). The motion sensors 103 are configured to detect or sense the motion or position of the apparatus 100. In various aspects of the disclosure, non-limiting examples of the motion sensors 103 may include gyroscopes, accelerometers, cameras, satellite trackers, or any devices capable of sensing or detecting motion and/or position.

The bus 102 may also link various other circuits such as timing sources, peripherals, voltage regulators, and power management circuits, which are well known in the art, and therefore, will not be described any further. A bus interface 108 provides an interface between the bus 102 and an optional transceiver 110. The transceiver 110 provides a communication interface or a means for communicating with various other apparatus over a transmission medium. Depending upon the nature of the apparatus, a user interface 112 (e.g., keypad, display, speaker, microphone, joystick, mouse, stylus, touchpad, touchscreen) may also be provided.

The processor 104 includes a gesture capturing block 140 that can be configured to capture and recognize gestures utilizing gesture elements. The gesture capturing block 140 includes a raw data capture block 142, a gesture element categorizing block 144, a contextual dependency determining block 146, and a gesture recognition block 148. The raw data capture block 142 can receive raw data of a gesture captured by one or more of the motion sensor 103, camera 130, and/or any suitable sensor for capturing gesture. The gesture element categorizing block 144 can categorize the raw data into one or more gesture elements, which will be described in detail below. The contextual dependency determining block 146 can determine a contextual dependency between the gesture elements. The contextual dependency of the gesture elements provides the temporal or sequential information or relationship between the gesture elements for a particular gesture. The gesture recognition block 148 can recognize the gesture based on its gesture elements and their contextual dependency.

The processor 104 is also responsible for managing the bus 102 and general processing, including the execution of software stored on the computer-readable medium 106. The software, when executed by the processor 104, causes the processing system 114 to perform the various functions described below in FIGS. 2-9 for any particular apparatus. In one aspect of the disclosure, the software may include a gesture recognition code or instructions 120, when executed by the processor 104, causes the processing system 114 to perform various gesture capturing and recognition functions described in FIGS. 2-9. In one example, the gesture recognition code 120 when executed can configure the apparatus 100 (e.g., the gesture capturing block 140) to perform various gesture capturing functions described in FIGS. 2-9. The apparatus 100 may capture a gesture by utilizing any combinations of the user interface 112, one or more of the motion sensors 103, one or more cameras 130, and any suitable sensors or input devices.

The computer-readable medium 106 may also be used for storing data that is used or manipulated by the processor 104 when executing software. In one aspect of the disclosure, a gesture vocabulary 122 (or gesture library) may be stored in the computer-readable medium 106. The gesture vocabulary 122 contains a plurality of gestures (or gesture data) that can be recognized by the apparatus 100. In one example, the vocabulary 122 may contain alphabets, letters, symbols, numbers, signs, or any suitable gestures. In some aspects of the disclosure, the vocabulary 122 may be modified, reduced, or expanded, by a user through a suitable training procedure.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
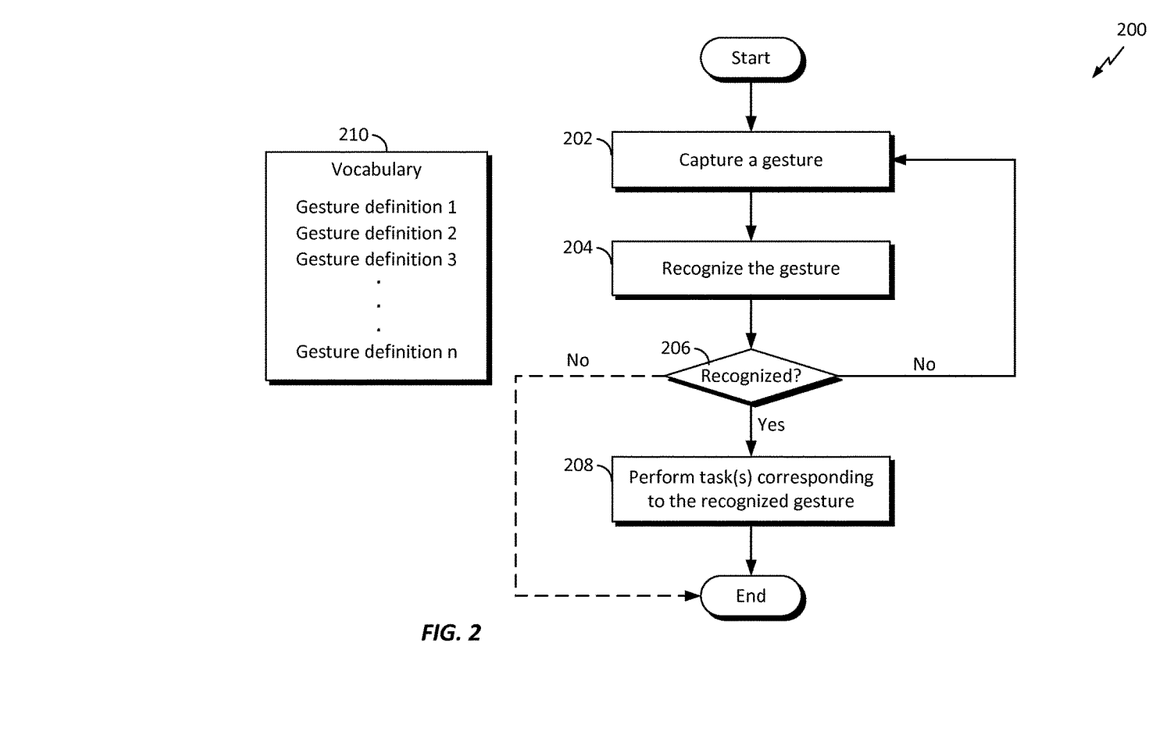
FIG. 2 is a flow diagram illustrating a gesture capturing method using gesture elements in accordance with an aspect of the disclosure.

FIG. 2 is a flow diagram illustrating a gesture capturing method 200 using gesture elements in accordance with an aspect of the disclosure. In one example, the method 200 may be performed by the apparatus 100 or any suitable devices. At block 202, the apparatus 100 captures a gesture utilizing one or more of its user interface 112 (e.g., a touchscreen, mouse, touchpad), motion sensors 103, cameras 130, or any suitable input devices. A gesture as used in this disclosure may refer to any non-verbal inputs or movements received or detected by the apparatus 100. In one example, a gesture may be inputted by moving the apparatus from a first position to a second position. Such movement may be detected by the apparatus using, for example, the motion sensors 103, which may be an accelerometer, an inertial sensor, or a gyroscope. In another example, a gesture may be inputted with a pointing device (e.g., a mouse or trackball) or by drawing on a touchscreen or a touchpad. In still another example, a gesture may be inputted by gesturing in front of a camera 130 of the apparatus. The gesture performed by any suitable method is captured, and its corresponding raw data is made available for further processing.

At block 204, once the data of one or more gestures is captured, the apparatus 100 performs an operation to recognize the captured gesture by processing the data associated with the captured gesture. For example, the data may include the raw data received from one or more of the apparatus' inputs or sensors including the user interface 112, motion sensors 103, and/or cameras 103. The operation of gesture recognition of block 204 will be described in more detail in the examples illustrated in FIGS. 3-9. At decision block 206, if the captured gesture is recognized (i.e., the captured gesture matches a gesture contained in a vocabulary), the method 200 proceeds to the block 208; otherwise, it may end or go back to the block 202, where another gesture may be captured. The apparatus 100 may execute the gesture recognition code 120 to perform the gesture capturing method 200 and various gesture recognition functions or procedures, which will be described in more detail below.

During gesture recognition, the apparatus 100 determines whether or not the captured gesture is one of the gestures in the vocabulary 122, which includes information regarding the gestures that the apparatus 100 can recognize or consider valid. In one aspect of the disclosure, the method 200 may utilize a vocabulary 210 that includes gesture definitions that describe, for each recognizable gesture, a set of gesture elements and their contextual dependency. The gesture elements and their contextual dependency will be described in detail below. In some examples, the vocabulary 210 may be the same as the vocabulary 122 of FIG. 1. At block 208, the apparatus 100 may perform one or more tasks or operations in response to the recognized gesture. For example, the apparatus may activate or deactivate a particular function or operation when the gesture is recognized. In another example, the recognized gesture may be input data or control to a certain user operation or program.

Figure 3:
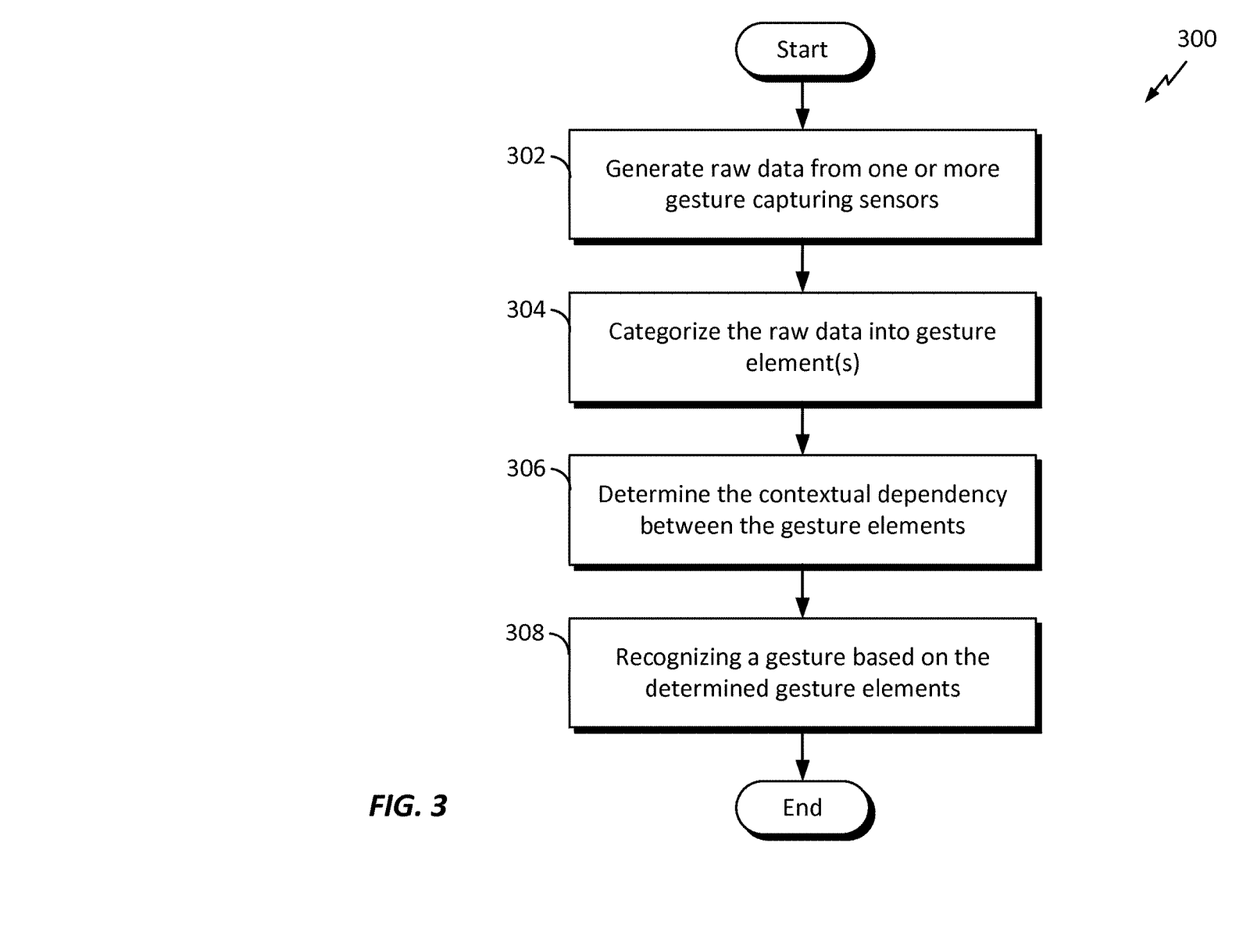
FIG. 3 is a flow diagram illustrating a gesture recognition method for recognizing gestures using contextual dependency between gesture elements in accordance with an aspect of the disclosure.

FIG. 3 is a flow diagram illustrating a gesture recognition method 300 for recognizing gestures using contextual dependency between gesture elements in accordance with an aspect of the disclosure. The method 300 may be performed by the apparatus 100 or any suitable devices to recognize a gesture. In one example, the method 300 may be performed at the block 204 of FIG. 2 to recognize gestures. The gesture recognition method 300 utilizes the contextual dependency between gesture elements to perform gesture recognition. Gesture recognition can be performed on a sequence of gesture elements rather than processing all raw data of a gesture at once. Therefore, data size may be reduced, and the overall recognition accuracy may be improved. Some non-limiting examples of gesture elements are up, down, left, right, up-left, up-right, down-left, down-right, circle, or any suitable movements. The gesture elements may include any other suitable distinguishable movements based on the type of sensor being used.

Figure 4:
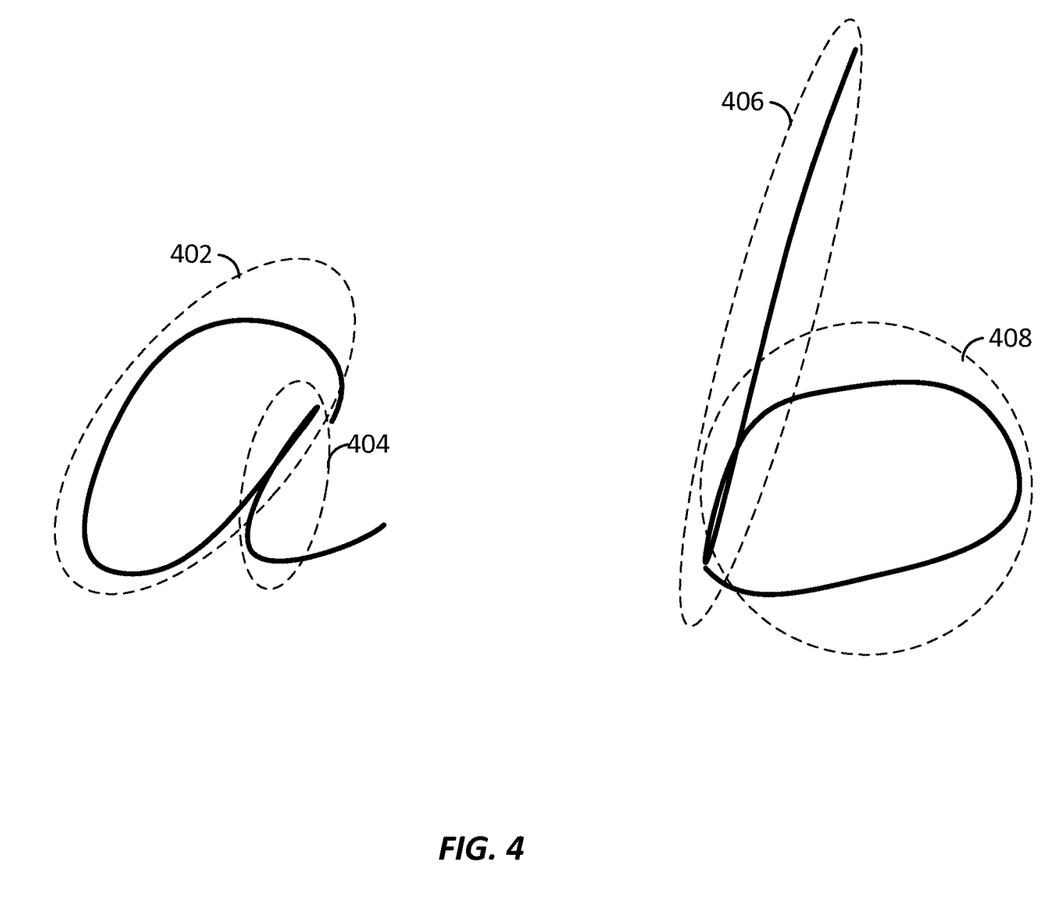
FIG. 4 is a drawing illustrating examples of gestures and the corresponding gesture elements in accordance with aspects of the disclosure.

Referring to FIG. 4, when a user draws a character "a" by operating the apparatus, the corresponding gesture elements may include a "circle" element 402 followed by a "down" element 404. Similarly, when a character "b" is drawn, the gesture elements may include a "down" element 406 followed by a "circle" element 408. Although both examples ("a" and "b" gestures) can generate the "circle" and "down" gesture elements, the gesture elements have different contextual dependency for the gestures "a" and "b." For the "a" gesture, the "circle" gesture element 402 is followed by the "down" gesture element 404. However, for the "b" gesture, the "down" gesture element 406 is followed by the "circle" gesture element 408. That is, the contextual dependency of the gesture elements can provide the temporal (time) or sequential information on the gesture elements for a particular gesture.

Referring back to FIG. 3, at block 302, the apparatus generates raw data corresponding to a captured gesture from one or more gesture capturing sensors. In one example, the apparatus utilizes the raw data capture block 142 to receive raw data that is generated by one or more gesture capturing sensors. Non-limiting examples of the sensors may include one or more of the user interface 112, motion sensor 103, and/or camera 130 of FIG. 1. In one particular example, the gesture may be captured by a motion sensor 103 when a user moves the apparatus in a certain pattern corresponding to the desired gesture (e.g., a letter "a").

Figure 5:
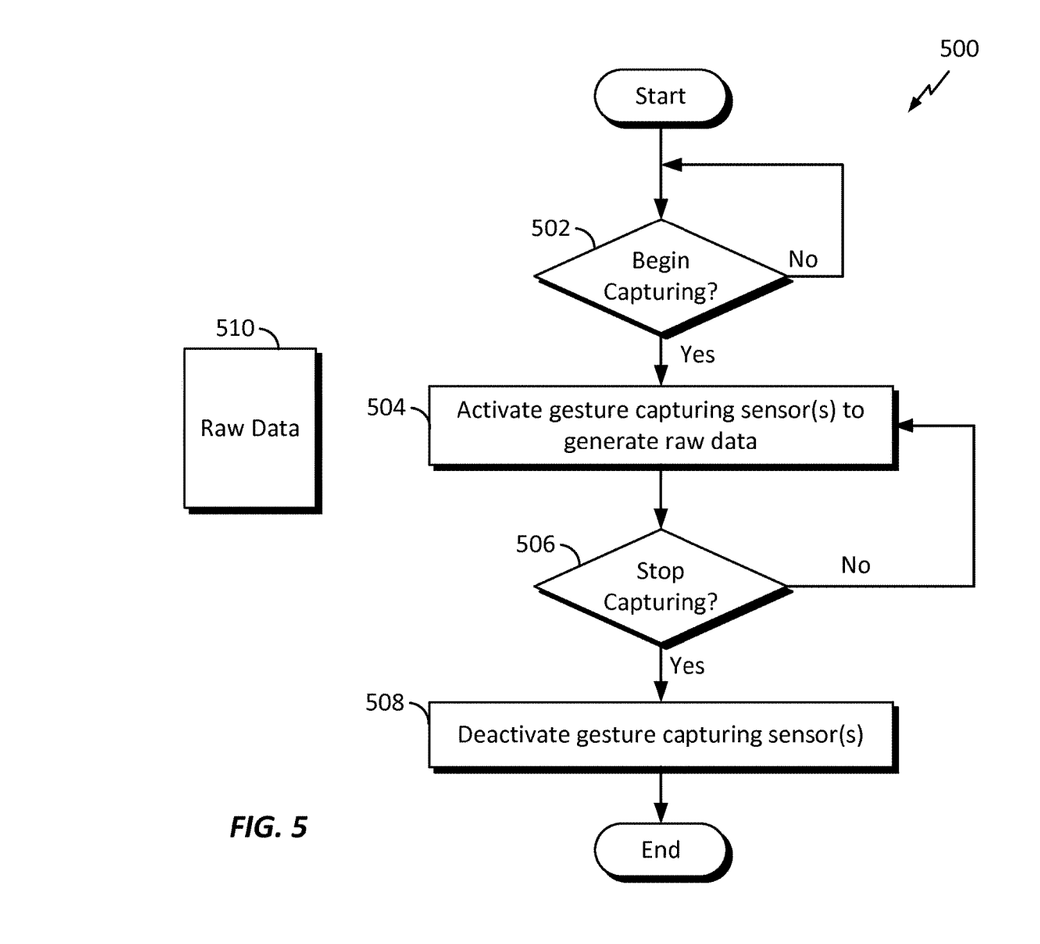
FIG. 5 is a flow diagram illustrating a method of controlling gesture capturing in accordance with an aspect of the disclosure.

FIG. 5 is a flow diagram illustrating a method 500 of controlling gesture capturing in accordance with an aspect of the disclosure. In one example, the method 500 may be performed by the apparatus 100. The apparatus may perform the method 500 at block 302 of FIG. 3 to control when the apparatus can start and/or stop gesture capturing functions. At decision block 502, if it is determined that the apparatus begins gesture capturing, the method proceeds to block 504; otherwise, it may remain at block 502. In some aspects of the disclosure, a user may operate a user interface 112 to signal when to begin and/or stop gesture capturing. In some aspects of the disclosure, the apparatus may begin and/or stop gesture capturing based on any suitable control mechanisms or predetermined conditions.

At block 504, the apparatus activates one or more gesture capturing sensors to generate raw data 510 corresponding to the captured gesture. In some examples, the apparatus may utilize the user interface 112, motion sensor 103, and/or camera 130 to capture gestures and generate the corresponding raw data. The raw data 510 may be stored at a suitable storage device such as the computer-readable medium 106, memory 105, and/or any non-transitory storage media in any suitable formats. In some examples, the raw data may be stored at one or more remote data storages (e.g., cloud storage). At decision block 506, if it is determined that the apparatus stops capturing, the method proceeds to block 508; otherwise, it proceeds to block 504. At block 508, the apparatus deactivates the gesture capturing sensor(s) or stops receiving raw data from the sensor(s). The raw data 510 captured by the method 500 may be processed and/or manipulated using the methods 300, 600, and/or 900 to recognize a gesture based on the contextual dependency between the gesture elements of the gesture.

Referring back to FIG. 3, at block 304, the apparatus may utilize the gesture element categorizing block 144 to process and categorize the raw data of the captured gesture into one or more gesture elements. In one example, the apparatus may have a gesture vocabulary 122 that may include a standard character set (e.g., Latin characters) or any predefined gesture patterns or symbols. The gesture vocabulary also stores the predetermined gesture elements for each recognizable gesture. In one aspect of the disclosure, the apparatus may process the raw data using an HMM-based method to determine the gesture elements for a certain gesture. For example, the raw data of the gesture "a" may be categorized as a "circle" gesture element followed by a "down" gesture element. In another example, the raw data of the gesture "b" may be categorized as a "down" gesture element followed by a "circle" gesture element. In another example, the raw data of the gesture "w" may be categorized as a "down-right" gesture element, an "up-right" gesture element, another "down-right" gesture element, and another "up-right" gesture element, in sequence.

At block 306, the apparatus may utilize the contextual dependency determining block 146 to determine and analyze the contextual dependency between the gesture elements of block 304. The contextual dependency refers to the probabilities of the gesture elements appearing next to each other in a particular temporal order or sequence. In one aspect of the disclosure, these probabilities may be trained using a Gaussian Mixture Model (GMM) or any suitable probabilistic models. In another aspect of the disclosure, the probabilities may be trained using a deep neural network (DNN). In one example, if the apparatus is configured to recognize the Latin characters, it may be contextually more likely (i.e., higher probability) that a "circle" gesture element is followed by a "down" gesture element, and not a "down-left" gesture element for a certain gesture. It is because it can be assumed that the probability of the "circle" followed by "down" dependency (e.g., for the letter "a") is higher than that of the "circle" followed by "down-left" dependency (e.g., for another gesture or an unrecognizable gesture). In some aspects of the disclosure, the apparatus may recategorize the gesture elements based on the determined contextual dependency.

At block 308, the apparatus may utilize the gesture recognition block 148 to recognize the captured gesture based on the gesture elements of block 306. In one aspect of the disclosure, contextual dependency determination may be continuous in nature. In some examples, the gesture elements may be predetermined Gesture elements may be added and/or removed by using a suitable training process of a machine learning method such as DNN. In some examples, new recognizable gestures may be added into the vocabulary and updating the corresponding contextual probabilities to classify the new gestures.

Figure 6:
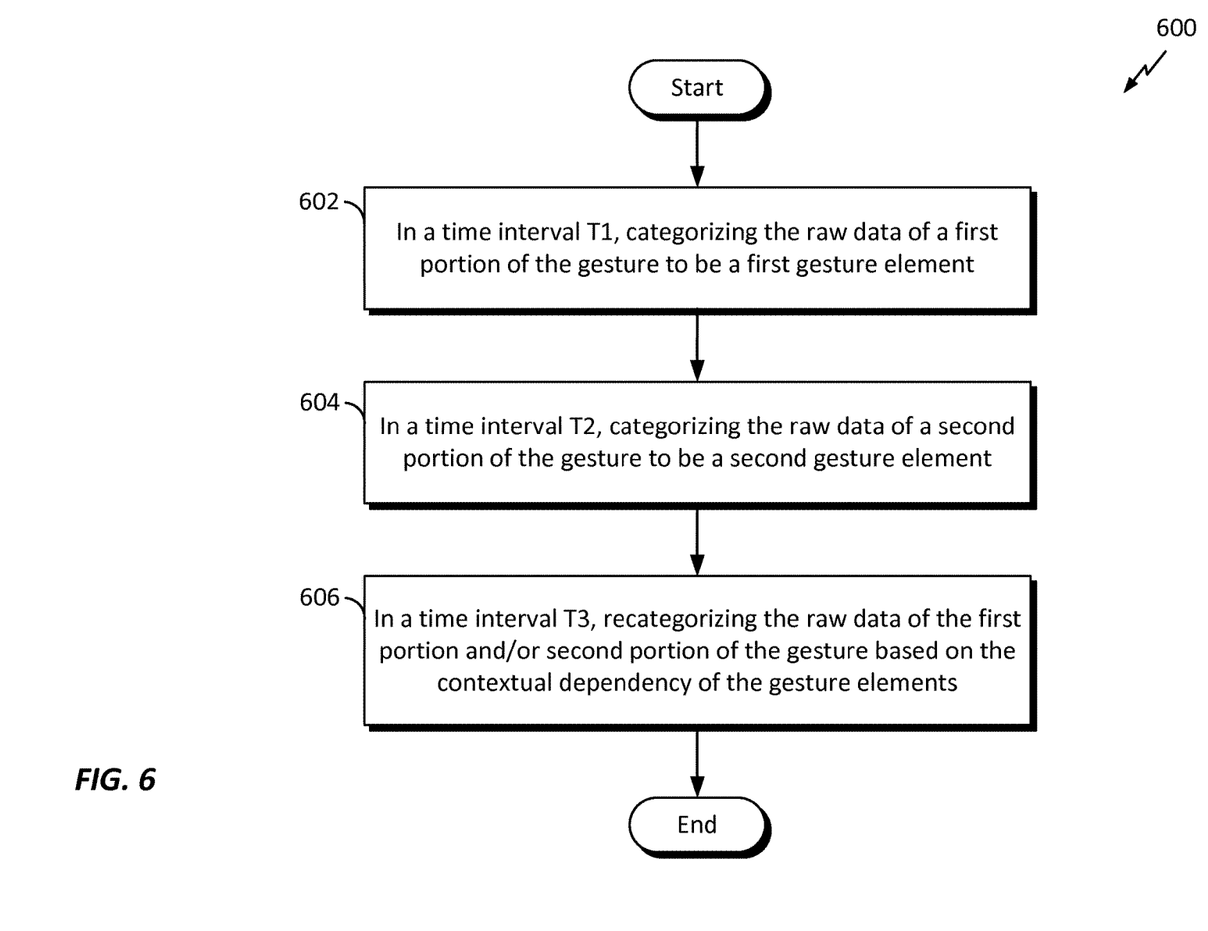
FIG. 6 is a flow diagram illustrating a gesture element categorizing method 600 in accordance with an aspect of the disclosure.

FIG. 6 is a flow diagram illustrating a gesture element categorizing method 600 in accordance with an aspect of the disclosure. The method 600 may be performed by the apparatus 100 or any suitable devices to categorize the raw data of a gesture as one or more gesture elements. In one example, an apparatus may utilize a gesture element categorizing block 144 (see FIG. 1) to categorize raw data into gesture elements. In the following description of the gesture element categorizing method 600, it may be assumed that the apparatus is capturing raw data for one or more gestures using certain sensor(s). At block 602, in a first time interval (T1), the apparatus categorizes the raw data of a first portion of the gesture to be a first gesture element using a suitable context model (e.g., GMM based model). At block 604, in a second time interval (T2), the apparatus categorizes the raw data of a second portion of the gesture to be a second gesture element. At block 606, in a third time interval (T3), the apparatus may recategorize the raw data of the first portion and/or second portion of the gesture based on the contextual dependency of the gesture elements. The apparatus may recategorize the previously categorized raw data to different gesture elements when the contextual dependency of the later categorized gesture elements indicate a higher probability for the recategorized gesture elements. The method 600 will be illustrated with an example described in reference to FIG. 7.

Figure 7:
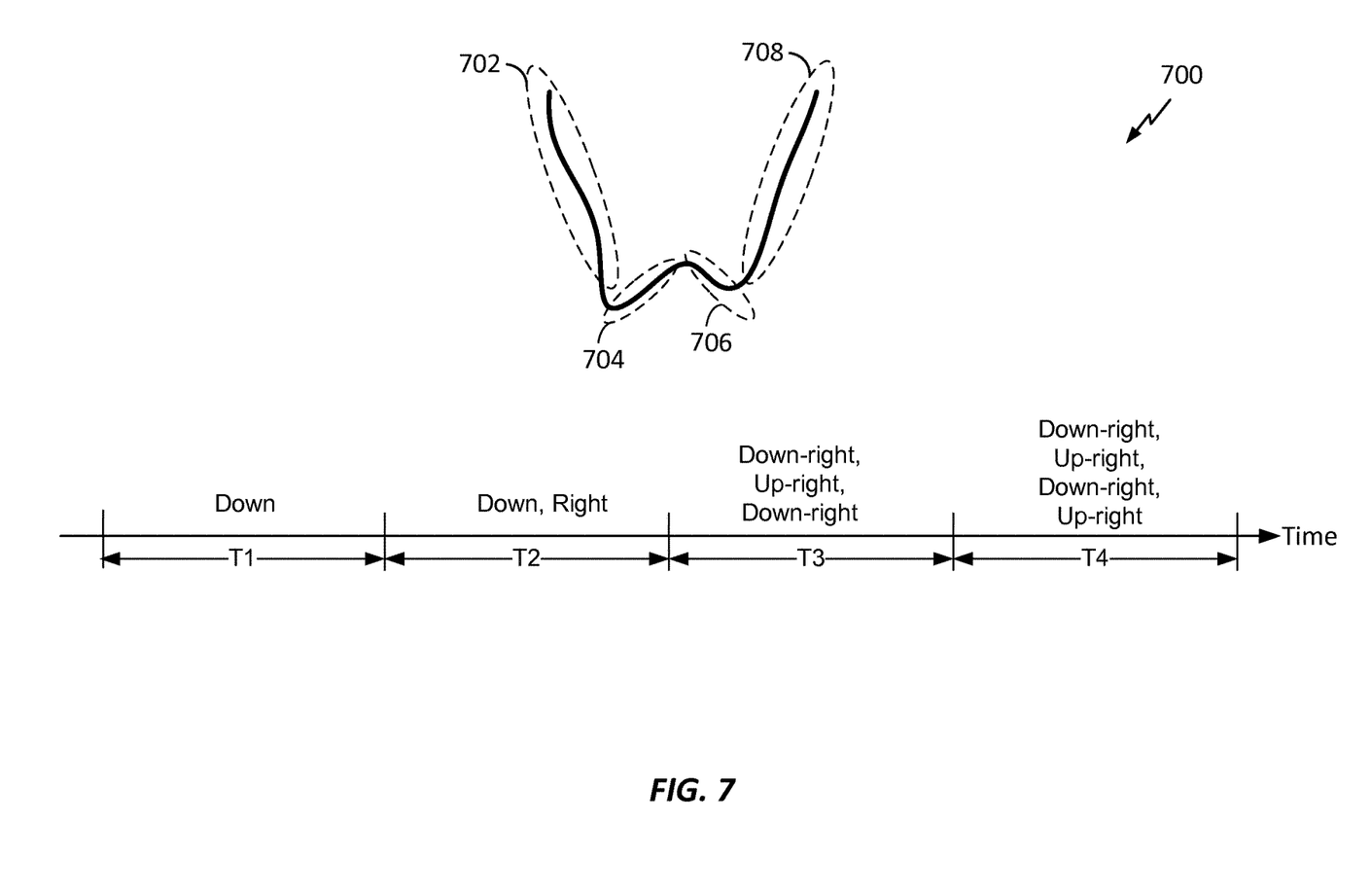
FIG. 7 is a drawing illustrating an example of a gesture element determination process based on contextual dependency between gesture elements in accordance with an aspect of the disclosure.

FIG. 7 is a drawing illustrating an example of a gesture element determination process 700 based on contextual dependency between gesture elements in accordance with an aspect of the disclosure. In one example, the process 700 may be performed by the apparatus 100 or any suitable devices utilizing the gesture element categorizing method 600, to categorize or recategorize the raw data of a gesture as one or more gesture elements using a suitable context model (e.g., GMM based model). In this particular example, it is assumed that a user is operating the apparatus 100 to gesture a letter "W". In a first time interval (T1), the raw data of a first portion 702 of the "W" gesture may be categorized as a "down" gesture element. In a second time interval (T2), the raw data of a second portion 704 of the "W" gesture may be categorized as a "right" gesture element even though the actual input data may also be determined to be an "up-right" gesture element. In this example, the apparatus may consider the probability that a "down" gesture element followed by a "right" gesture element, is higher than that of a "down" gesture element followed by an "up-right" gesture element in accordance with the context model. Up to this point, if no more raw data needs to be processed, the determined gesture elements from the first and second time intervals may be recognized as a letter "L" gesture, which may be a valid gesture of the vocabulary. In this example, more raw data will be processed.

In a third time interval (T3), the raw data of a third portion 706 of the "W" gesture may be categorized as a "down-right" gesture element. In this case, the determination of this "down-right" gesture element may cause the apparatus to recategorize the gesture elements determined in the first and second time intervals. Based on the contextual dependency among the gesture elements (e.g., for the first, second, and third portions) determined so far, the apparatus may determine that the probability of the gesture elements of the time intervals T1, T2 being "down-right" and "up-right," will be higher than the previous categorization. Accordingly, the apparatus may recategorize the gesture elements for the first through third time intervals as "down-right," "up-right," and "down-right." Then, in a fourth time interval (T4), the raw data of a fourth portion 708 of the "W" gesture may be categorized as an "up-right" gesture element. At this point, if gesture capturing is stopped, these gesture elements of the time intervals T1-T4 may be utilized to recognize the "W" gesture, for example, in the block 308 of FIG. 3. This contextual dependency based gesture elements categorization may be continuous in nature (temporally continuous). That is, the raw data previously categorized may be recategorized based on the categorization of future data until a valid gesture is recognized or gesture recognition is stopped.

Figure 8:
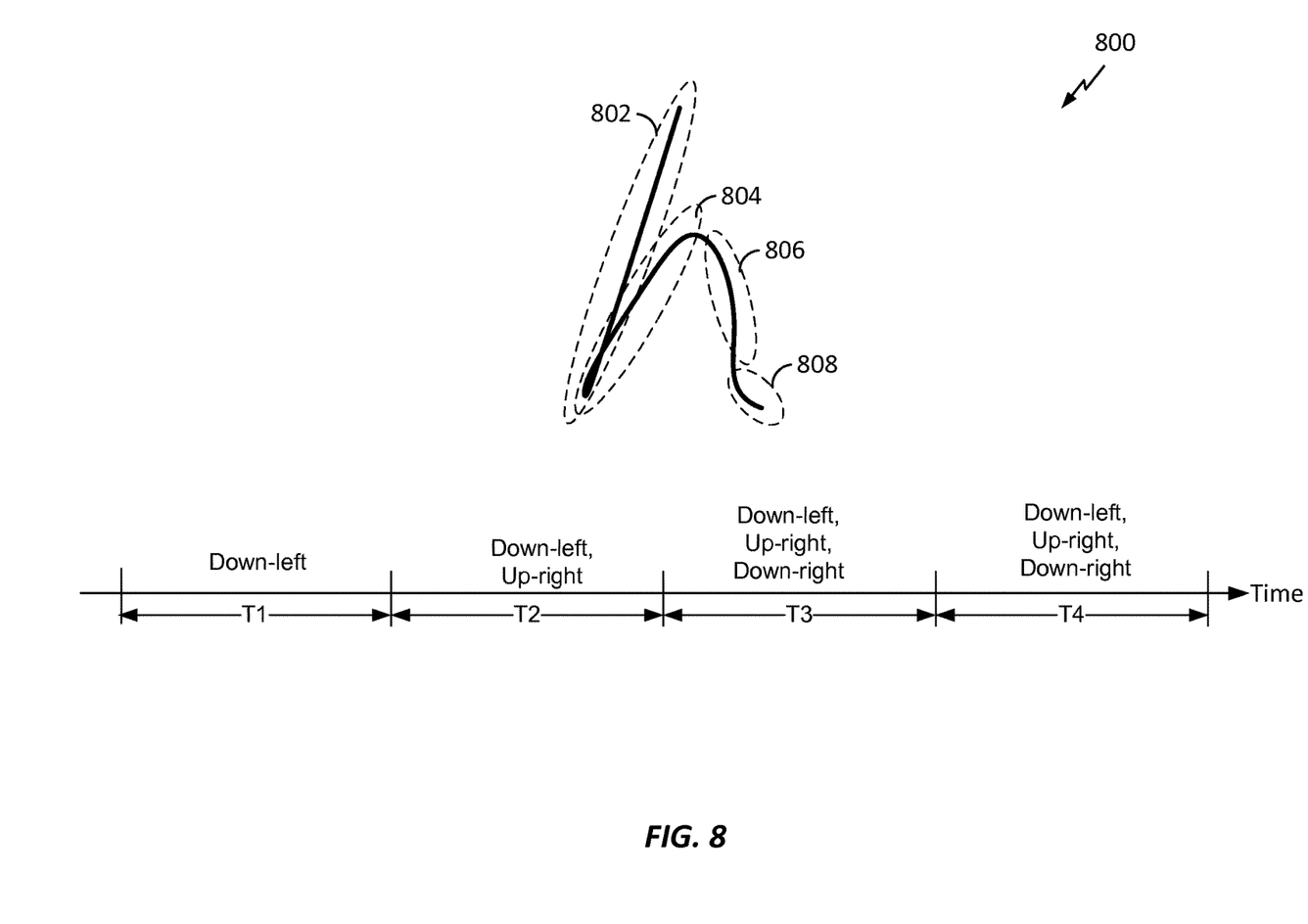
FIG. 8 is a drawing illustrating another example of a gesture element determination process based on contextual dependency between gesture elements in accordance with an aspect of the disclosure.

FIG. 8 is a drawing illustrating another example of a gesture element determination process 800 based on contextual dependency between gesture elements in accordance with an aspect of the disclosure. In one example, the process 800 may be performed by the apparatus 100 or any suitable devices to categorize or recategorize the raw data of a gesture as one or more gesture elements using a suitable context model (e.g., GMM based model). In this particular example, it is assumed that a user is operating the apparatus 100 to gesture a letter "h". In a first time interval (T1), the raw data of a first portion 802 of the "h" gesture may be categorized as a "down-left" gesture element. In a second time interval (T2), the raw data of a second portion 804 of the "h" gesture may be categorized as an "up-right" gesture element. In this example, the apparatus may consider the probability that a "down-left" gesture element followed by an "up-right" gesture element, being higher than those of other possible combinations in accordance with certain context model.

In a third time interval (T3), the raw data of a third portion 806 of the "h" gesture may be categorized as a "down-right" gesture element. Then, in a fourth time interval (T4), the raw data of a fourth portion 808 of the "h" gesture and the raw data of the third portion 806 may be combined and recategorized together as a single "down-right" gesture element. At this point, if gesture capturing is stopped, these gesture elements of the time intervals T1-T4 may be utilized to recognize the "h" gesture, for example, in the block 308 of FIG. 3. This contextual dependency based gesture elements categorization/recategorization may be continuous in nature (temporally continuous) until a valid gesture is recognized or gesture recognition is stopped.

Figure 9:
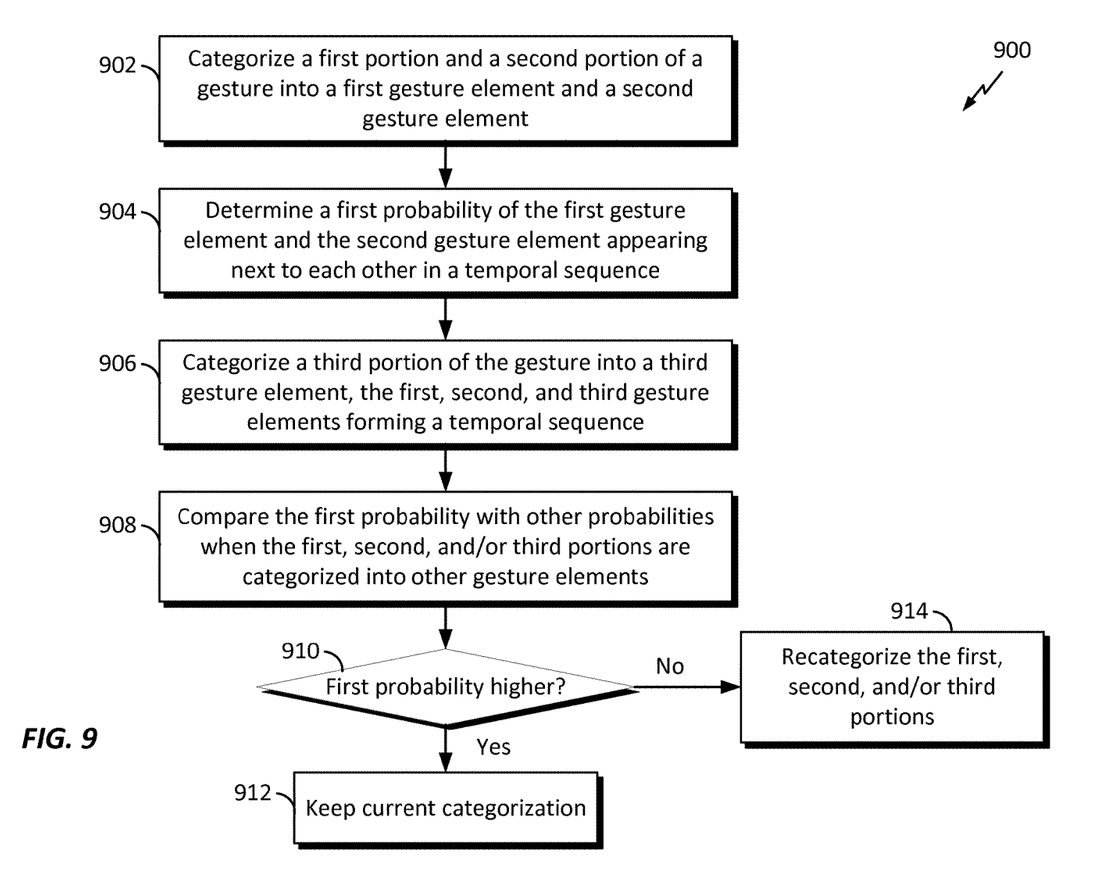
FIG. 9 is a flow diagram illustrating a gesture element recategorization method in accordance with an aspect of the disclosure.

FIG. 9 is a flow diagram illustrating a gesture element recategorization method 900 in accordance with an aspect of the disclosure. The method 900 may be performed by the apparatus 100 or any suitable devices to recategorize the raw data of a gesture. In one example, an apparatus may utilize a gesture element categorizing block 144 (see FIG. 1) to recategorize gesture elements. At block 902, an apparatus categorizes a first portion and a second portion of a gesture into a first gesture element and a second gesture element, respectively. For example, the gesture may be the "W" letter of FIG. 7. The first portion may be the portion 702, and the second portion may be the portion 704 of FIG. 7. At block 904, the apparatus determines a first probability ($P_1$) of the first gesture element and the second gesture element appearing next to each other in a temporal sequence. At block 906, the apparatus further categorizes a third portion of the gesture into a third gesture element, and the first, second, and third gesture elements form a temporal sequence. At block 908, the apparatus compares the first probability ($P_1$) with other probabilities ($P_2$, $P_3$, $P_4$, . . . $P_n$) when the first, second, and/or third portions are categorized into other possible gesture elements. If the first probability is the higher than the others (i.e., $P_1 > P_2$, $P_3$, $P_4$, . . . , or $P_n$), the apparatus keeps the current categorization at block 912; otherwise, the apparatus may recategorize the first, second, and/or third portions at block 914. In other examples, the gesture element recategorization method 900 may be extended to examples involving more than three gesture elements.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions.

Additional elements, components, steps, and/or functions may also be added without departing from novel features disclosed herein. The apparatus, devices, and/or components illustrated in FIG. 1 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of recognizing gesture operable at an apparatus, comprising:
    generating raw data of a gesture from one or more gesture capturing sensors;
    categorizing the raw data into a plurality of gesture elements, each gesture element corresponding to a predetermined movement identified from the raw data;
    determining a contextual dependency between the plurality of gesture elements, wherein the contextual dependency comprises probabilities of the plurality of gesture elements appearing next to each other in a temporal order or sequence;
    recategorizing the raw data into different gesture elements based on the contextual dependency between the plurality of gesture elements; and
    recognizing the gesture based on the determined gesture elements.

2. The method of claim 1, wherein the recategorizing the raw data comprises:
    in a first time interval, categorizing the raw data of a first portion of the gesture to be a first gesture element; and
    in a second time interval after the first time interval, categorizing the raw data of the first portion of the gesture as a second gesture element based on the contextual dependency of the gesture elements.

3. The method of claim 1, wherein the raw data obtained from the gesture capturing sensors, has not been subjected to processing or manipulation related to gesture recognition.

4. The method of claim 1, wherein the one or more gesture capturing sensors comprise at least one of a gyroscope, an accelerometer, a camera, a satellite tracker, a motion sensing device, or a position sensing device.

5. The method of claim 1, wherein the probabilities of the one or more gesture elements appearing next to each other in a temporal order or sequence is determined by utilizing a Gaussian Mixture Model.

6. The method of claim 1, wherein the probabilities of the plurality of gesture elements appearing next to each other in a temporal order or sequence is determined by utilizing a deep neural network.

7. The method of claim 1, wherein the gesture comprises a non-verbal input received by the apparatus.

8. The method of claim 1, wherein the recognizing the gesture comprises determining a gesture in a vocabulary corresponding to the gesture elements.

9. The method of claim 1, wherein the categorizing the raw data comprises processing the raw data using a Hidden Markov Model based method to determine the gesture elements.

10. An apparatus for recognizing gesture, comprising:
    one or more gesture capturing sensors;
    a raw data capture block configured to generate raw data of a gesture from the gesture capturing sensors;
    a gesture elements categorizing block configured to categorize the raw data into a plurality of gesture elements and to recategorize the raw data into different gesture elements based on a contextual dependency between the plurality of gesture elements, wherein each gesture element corresponds to a predetermined movement identified from the raw data;
    a contextual dependency determining block configured to determine a contextual dependency between the plurality of gesture elements, wherein the contextual dependency comprises probabilities of the plurality of gesture elements appearing next to each other in a temporal order or sequence; and
    a gesture recognition block configured to recognize the gesture based on the determined gesture elements.

11. The apparatus of claim 10, wherein the gesture elements categorizing block is configured to:
    in a first time interval, categorize the raw data of a first portion of the gesture to be a first gesture element; and
    in a second time interval after the first time interval, categorize the raw data of the first portion of the gesture as a second gesture element based on the contextual dependency of the gesture elements.

12. The apparatus of claim 10, wherein the raw data obtained from the gesture capturing sensors, has not been subjected to processing or manipulation related to gesture recognition.

13. The apparatus of claim 10, wherein the one or more gesture capturing sensors comprise at least one of a gyroscope, an accelerometer, a camera, a satellite tracker, a motion sensing device, or a position sensing device.

14. The apparatus of claim 10, wherein the probabilities of the plurality of gesture elements appearing next to each other in a temporal order or sequence is determined by utilizing a Gaussian Mixture Model.

15. The apparatus of claim 10, wherein the probabilities of the plurality of gesture elements appearing next to each other in a temporal order or sequence is determined by utilizing a deep neural network.

16. The apparatus of claim 10, wherein the gesture comprises a non-verbal input received by the apparatus.

17. The apparatus of claim 10, wherein the gesture recognition block is configured to recognize a gesture in a vocabulary corresponding to the gesture elements.

18. The apparatus of claim 10, wherein the gesture elements categorizing block is configured to process the raw data using a Hidden Markov Model based method to determine the gesture elements.

19. An apparatus for recognizing gesture, comprising:
   means for generating raw data of a gesture from one or more gesture capturing sensors;
   means for categorizing the raw data into a plurality of gesture elements, each gesture element corresponding to a predetermined movement identified from the raw data;
   means for determining a contextual dependency between the plurality of gesture elements, wherein the contextual dependency comprises probabilities of the plurality of gesture elements appearing next to each other in a temporal order or sequence;
   means for recategorizing the raw data based on the contextual dependency between the plurality of gesture elements; and
   means for recognizing the gesture based on the determined gesture elements.

20. The apparatus of claim 19, wherein the means for recategorizing the raw data is configured to:
   in a first time interval, categorize the raw data of a first portion of the gesture to be a first gesture element; and
   in a second time interval after the first time interval, categorize the raw data of the first portion of the gesture as a second gesture element based on the contextual dependency of the gesture elements.

21. A computer-readable medium comprising code for causing an apparatus to recognize gesture, the code when executed causes the apparatus to:
   generate raw data of a gesture from one or more gesture capturing sensors;
   categorize the raw data into a plurality of gesture elements;
   determine a contextual dependency between the plurality of gesture elements, wherein the contextual dependency comprises probabilities of the plurality of gesture elements appearing next to each other in a temporal order or sequence;
   recategorize the raw data based on the contextual dependency between the plurality of gesture elements; and
   recognize the gesture based on the determined gesture elements.

22. The computer-readable medium of claim 21, wherein the code when executed further causes the apparatus to recategorize the raw data by:
   in a first time interval, categorizing the raw data of a first portion of the gesture to be a first gesture element; and
   in a second time interval after the first time interval, categorizing the raw data of the first portion of the gesture as a second gesture element based on the contextual dependency of the gesture elements.

* * * * *